United States Patent
Hong et al.

(10) Patent No.: US 10,303,280 B2
(45) Date of Patent: May 28, 2019

(54) TOUCH SENSOR AND DISPLAY DEVICE INCLUDING THE SAME

(71) Applicant: SAMSUNG DISPLAY CO., LTD., Yongin-si, Gyeonggi-Do (KR)

(72) Inventors: Won Ki Hong, Yongin-si (KR); Won Sang Park, Yongin-si (KR); Tae Hee Lee, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/583,648

(22) Filed: May 1, 2017

(65) Prior Publication Data

US 2018/0081478 A1    Mar. 22, 2018

(30) Foreign Application Priority Data

Sep. 20, 2016    (KR) .................. 10-2016-0120244

(51) Int. Cl.
  *G06F 3/045*    (2006.01)
  *G06F 3/041*    (2006.01)
  *G06F 3/044*    (2006.01)

(52) U.S. Cl.
  CPC ............ *G06F 3/0414* (2013.01); *G06F 3/044* (2013.01); *G06F 3/0418* (2013.01)

(58) Field of Classification Search
  USPC ..... 345/173, 174, 156, 175, 178; 178/18.01; 715/763
  See application file for complete search history.

(56) References Cited

U.S. PATENT DOCUMENTS

| | | | |
|---|---|---|---|
| 6,239,790 B1 * | 5/2001 | Martinelli | G06F 3/03547 178/18.01 |
| 7,511,702 B2 | 3/2009 | Hotelling | |
| 7,538,760 B2 | 5/2009 | Hotelling et al. | |
| 8,654,524 B2 | 2/2014 | Pance et al. | |
| 8,686,952 B2 | 4/2014 | Burrough et al. | |
| 8,787,006 B2 | 7/2014 | Golko et al. | |
| 9,024,904 B2 | 5/2015 | Jung et al. | |
| 9,024,907 B2 | 5/2015 | Bolender | |
| 9,178,509 B2 | 11/2015 | Bernstein et al. | |
| 9,274,660 B2 | 3/2016 | Bernstein et al. | |
| 9,513,663 B2 | 12/2016 | Jones et al. | |
| 2007/0146334 A1 * | 6/2007 | Inokawa | G06F 3/016 345/173 |

(Continued)

FOREIGN PATENT DOCUMENTS

KR    10-2014-0017351    2/2014
KR    10-2015-0102364    9/2015

*Primary Examiner* — Thuy N Pardo
(74) *Attorney, Agent, or Firm* — F. Chau & Associates, LLC

(57) ABSTRACT

A touch sensor includes a pressure sensor configured to become compressed along a first axis in response to a touch input into a touch area and a controller. The controller is configured to calculate a position of the touch and an intensity of the touch by using a detection signal obtained from the pressure sensor. The controller is further configured to calculate a first position, which has a greatest value of compression of the pressure sensor along the first axis, and calculate a position of the touch by correcting the first position by a first correction value corresponding to the greatest value of compression.

20 Claims, 10 Drawing Sheets

(56) References Cited

U.S. PATENT DOCUMENTS

| | | |
|---|---|---|
| 2012/0013576 A1* | 1/2012 | Chung ................ G02B 26/103 345/175 |
| 2012/0218215 A1* | 8/2012 | Kleinert ............... G06F 3/0418 345/173 |
| 2014/0028575 A1 | 1/2014 | Parivar et al. |
| 2014/0085213 A1 | 3/2014 | Huppi et al. |
| 2014/0109698 A1 | 4/2014 | Lussey et al. |
| 2014/0125615 A1* | 5/2014 | Sato ..................... G06F 3/0488 345/173 |
| 2015/0015541 A1* | 1/2015 | Kan ..................... G06F 3/0418 345/175 |
| 2015/0160774 A1* | 6/2015 | Zhai ..................... G06F 3/0416 345/173 |
| 2015/0193056 A1 | 7/2015 | Bolender |
| 2015/0205461 A1 | 7/2015 | Severac et al. |
| 2015/0242053 A1* | 8/2015 | Gao ..................... G06F 3/0418 345/178 |
| 2015/0268802 A1* | 9/2015 | Kim ..................... G06F 3/0482 715/763 |
| 2016/0034089 A1* | 2/2016 | Kano .................... G06F 3/044 345/173 |
| 2016/0070371 A1* | 3/2016 | Oonishi ................ G06F 3/044 345/174 |
| 2016/0154518 A1* | 6/2016 | Ukai ..................... G06F 3/0416 345/173 |
| 2017/0108965 A1* | 4/2017 | Kim ...................... G06F 3/044 345/174 |

* cited by examiner

TOUCH SENSOR AND DISPLAY DEVICE INCLUDING THE SAME

CROSS REFERENCE TO RELATED APPLICATION

This application claims priority to and the benefit of Korean Patent Application No. 10-2016-0120244, filed on Sep. 20, 2016, in the Korean Intellectual Property Office, the entire contents of which are incorporated by reference herein in their entirety.

TECHNICAL FIELD

The present disclosure relates to a touch sensor, and more particularly, to a touch sensor and a display device including the same.

DISCUSSION OF THE RELATED ART

Often, display devices for displaying images are designed to include a touch sensor for receiving a touch of a user. The display device including the touch sensor, which are often called "touchscreens," may be used as a tool for allowing users to conveniently interact with their electronic devices.

While some touchscreens are only capable of registering the existence of touches, other touchscreens are able to register the pressure applied by the touches as and may thereby provide an added level of user input.

SUMMARY OF THE INVENTION

A touch sensor includes a pressure sensor configured to become compressed along a first axis in response to a touch input into a touch area and a controller. The controller is configured to calculate a position of the touch and an intensity of the touch by using a detection signal obtained from the pressure sensor. The controller is further configured to calculate a first position, which has a greatest value of compression of the pressure sensor along the first axis, and calculate a position of the touch by correcting the first position by a first correction value corresponding to the greatest value of compression.

A display device includes a touch sensor including a pressure sensor. The pressure sensor is configured to become compressed along a first axis in response to a touch input into a touch area, and is configured to calculate a position of the touch and an intensity of the touch by using a detection signal obtained from the pressure sensor. A display panel is disposed in one surface of the touch sensor. A bracket is configured to accommodate the touch sensor and the display panel. A window is coupled to the bracket. Wherein the touch sensor is further configured to calculate a first position, which has a greatest value of compression of the pressure sensor along the first axis, and calculate the position of the touch by correcting the first position by a first correction value corresponding to the greatest value of compression.

A touch-sensitive display device includes a display panel. A pressure sensor is disposed on the display panel and generates a detection signal in response to a touch thereon. A controller is configured to calculate a position of the touch and an intensity of the touch in response to the detection signal of the pressure sensor and to correct the calculated position of the touch or the calculated intensity of the touch according to a distance between the calculated position of the touch and a nearest edge of the display panel.

BRIEF DESCRIPTION OF THE DRAWINGS

A more complete appreciation of the present disclosure and many of the attendant aspects thereof will be readily obtained as the samne becomes better understood by reference to the following detailed description when considered in connection with the accompanying drawings, wherein.

DETAILED DESCRIPTION OF THE INVENTION

Figure 1A:
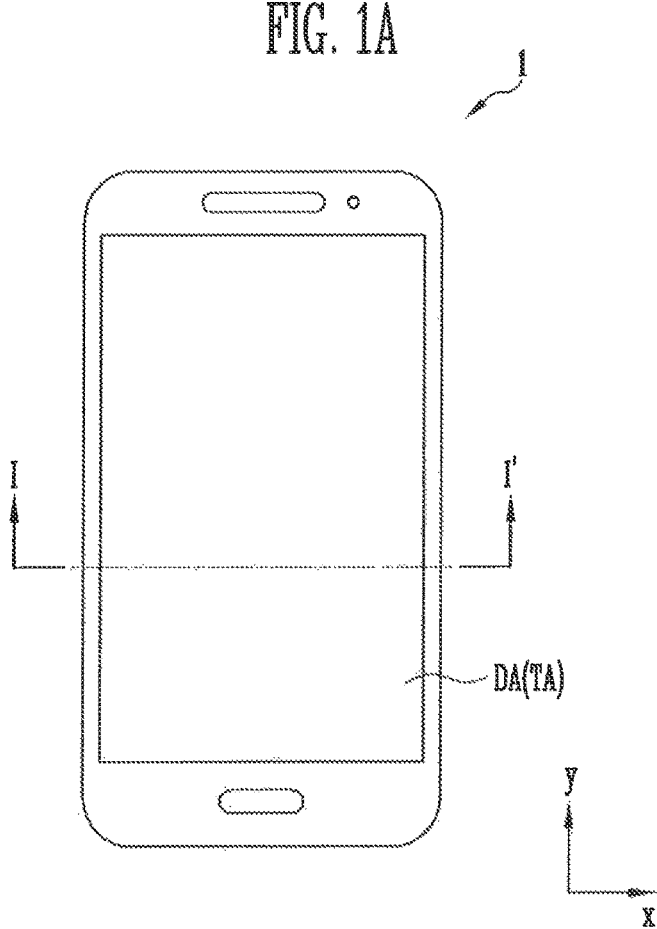
FIG. 1A is a diagram illustrating a display device according to an exemplary embodiment of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

The present invention is not limited to the exemplary embodiments disclosed below and may be implemented in various forms. When one constituent element is referred to as being "connected to" another constituent element, one constituent element may be directly coupled to or connected to the other constituent element, or intervening elements may also be present. Further, like reference numerals designate like elements throughout the specification and the drawings.

Hereinafter, a touch sensor, a display device including the same, and a driving method thereof, according to exemplary embodiments of the present invention, will be described with reference to the drawings.

Figure 1B:
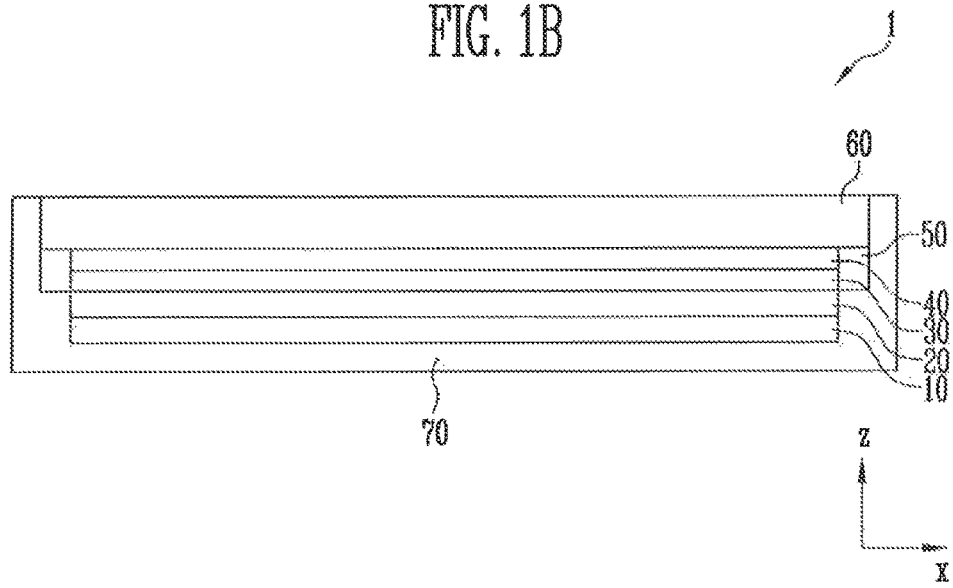
FIG. 1B is a cross-sectional view taken along line I-I' of FIG. 1A.

FIG. 1A is a diagram illustrating a display device according to an exemplary embodiment of the present disclosure, and FIG. 1B is a cross-sectional view taken along line I-I' of FIG. 1A.

Referring to FIGS. 1A and 1B, a display device 1, according to the present disclosure, may include a touch sensor 10, a display panel 20, a window 60, and a bracket 70.

The touch sensor 10 may calculate a position and an intensity (e.g. pressure) of the touch input to a touch area TA.

The display panel 20 may display an image through a display area DA, and may be disposed on the touch sensor 10. The display area DA may be the same as the touch area TA.

The bracket 70 may accommodate the touch sensor 10, the display panel 20, and other elements.

A polarizing plate 30 may be disposed at a lower side of the window 60, and a first attachment member 40 may be disposed between the window 60 and the polarizing plate 30. However, the polarizing plate 30 may be omitted as necessary.

Further, the window 60 may be coupled with the bracket 70 through a second attachment member 50.

The first attachment member 40 and the second attachment member 50 may each include an optically transparent adhesive, other resins, a tape, or the like.

Figure 2:
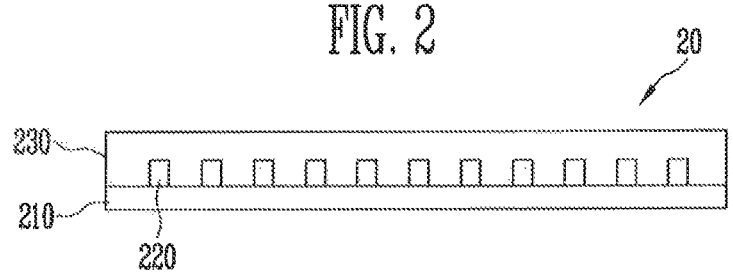
FIG. 2 is a diagram illustrating a display panel according to an exemplary embodiment of the present disclosure.

FIG. 2 is a diagram illustrating the display panel according to an exemplary embodiment of the present disclosure.

Referring to FIG. 2, the display panel 20, according to an exemplary embodiment of the present disclosure, may include a substrate 210, pixels 220, and an encapsulation layer 230 disposed over the pixels 220.

A plurality of pixels 220 may be disposed on the substrate 210. Further, the encapsulation layer 230 may be disposed on the pixels 220 and the substrate 210.

For example, the substrate 210 may include an insulating material, such as glass or resin. Further, the substrate 210 may include a flexible material so that the substrate 210 may be bendable or foldable. The substrate 210 may have a single-layer structure or a multi-layer structure.

For example, the substrate 210 may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and/or cellulose acetate propionate.

However, the composition of the substrate 210 may be variously changed, and may include Fiber Glass Reinforced Plastic (FRP), or the like.

The pixels 220 may emit light under the control of a display driver, and may be protected by the encapsulation layer 230.

For example, the encapsulation layer 230 may prevent moisture, oxygen, and impurities from permeating into the pixels 220.

In this case, the encapsulation layer 230 may include glass, an organic material, and/or an inorganic material, and may have a single structure or a multi-layer structure.

For example, the encapsulation layer 230 may have a multi-layer structure including one or more organic layers and one or more inorganic layers.

The organic layer may include a fluoride-based carbon compound, such as polyacryl, polyimide, and/or Teflon, and an organic insulating material, such as poly epoxy and/or benzocyclobutene. The inorganic material may include polysiloxane, a silicon nitride, a silicon oxide, and/or an inorganic insulating material including an aluminum oxide.

Figure 3:
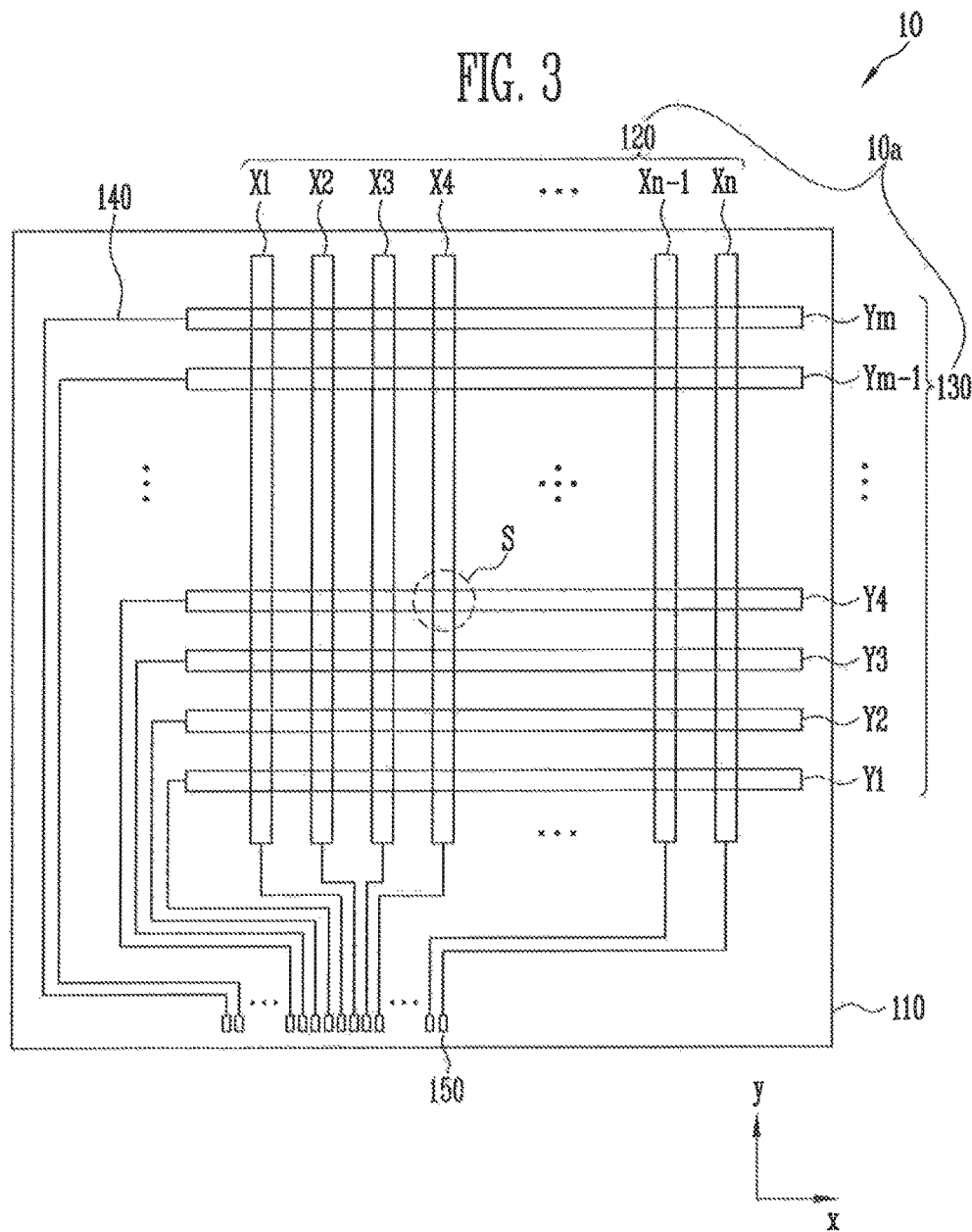
FIG. 3 is a top plan view illustrating a touch sensor according to an exemplary embodiment of the present disclosure.

FIG. 3 is a top plan view illustrating the touch sensor according to an exemplary embodiment of the present disclosure.

Referring to FIG. 3, the touch sensor 10 may include a substrate 110, and a pressure sensor 10a disposed on the substrate 110.

The pressure sensor 10a may include first electrodes 120 and second electrodes 130. The first electrodes 120 and the second electrodes 130 may include a conductive material.

According to an exemplary embodiment of the present disclosure, the conductive material may include a metal or an alloy thereof. The metal may include gold (Au), silver (Ag), aluminum (Al), molybdenum (Mo), chromium (Cr), titanium (Ti), nickel (Ni), neodymium (Nd), copper (Cu), platinum (Pt), or the like.

The first and second electrodes 120 and 130 may include a transparent conductive material. The transparent conductive material may include a silver nano wire (AgNW), an indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide ($SnO_2$), a carbon nano tube, graphene, or the like. The first and second electrodes 120 and 130 may be formed as a single layer or as multiple layers.

Elastic members may be disposed between the first electrodes 120 and the second electrodes 130.

The first electrodes 120 may include n electrodes X1 to Xn, which are sequentially arranged in an x-axis direction. The second electrodes 130 may include m electrodes Y1 to Ym, which are sequentially arranged in a y-axis direction vertical to the x-axis direction. Herein, n and m are positive integers.

A driving voltage for driving the pressure sensor 10a is applied to at least one of the first electrodes 120 and the second electrodes 130, and a detection signal corresponding to a capacitance variation may be obtained from the remaining electrodes.

The substrate 110 may include an insulating material, such as glass and resin. Further, the substrate 110 may be formed of a flexible material so as to be bendable or foldable, and may have a single-layer structure or a multi-layer structure.

For example, the substrate 110 may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and/or cellulose acetate propionate.

However, the material of the substrate 110 may be variously changed, and may include Fiber Glass Reinforced Plastic (FRP), or the like.

Wires 140 may be connected between the first and second electrodes 120 and 130 and pads 150. Further, the wires 140 may be connected to a controller through the pads 150.

When a touch is input into the pressure sensor 10a, a capacitance between the first and second electrodes 120 and 130 is changed as a result of the touch. Accordingly, the controller may detect a position of the touch by using signals output from the first electrodes 120 and/or the second electrodes 130. Further, the controller may also detect an intensity of the touch by seeing how the capacitance changes.

Figure 4:
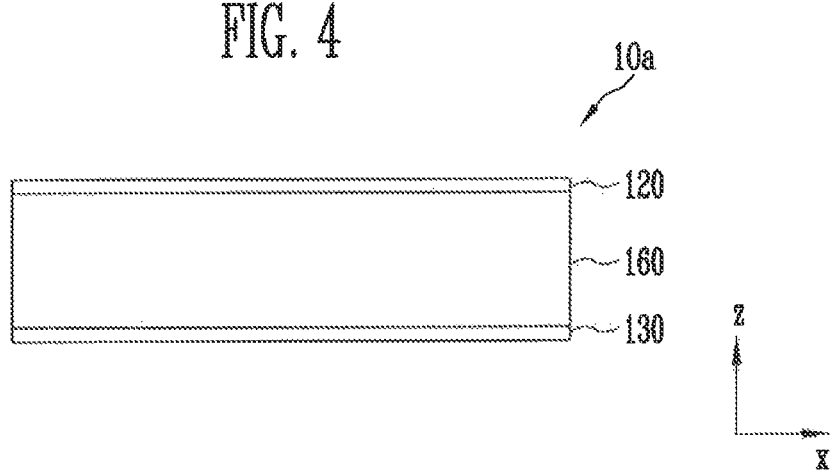
FIG. 4 is a cross-sectional view illustrating a partial region S of a pressure sensor illustrated in FIG. 3 in greater detail.

FIG. 4 is a cross-sectional view illustrating a partial region S of the pressure sensor illustrated in FIG. 3 in greater detail.

Referring to FIGS. 3 and 4, the pressure sensor 10a, according to an exemplary embodiment of the present disclosure, may further include an elastic member 160 disposed between the first electrode 120 and the second electrode 130.

The first electrode 120 and the second electrode 130 may be spaced apart from each other. In this case, the first electrode 120 and the second electrode 130 may serve as capacitors, and a capacitance may be formed between the first electrode 120 and the second electrode 130.

The capacitance between the first electrode 120 and the second electrode 130 may be varied according to a distance of spacing between the first electrode 120 and the second electrode 130.

For example, when a touch is generated on the touch sensor 10, a distance between the first electrode 120 and the second electrode 130 disposed at a place corresponding to the touch is changed, and thus, capacitance may be changed.

Accordingly, it is possible to recognize a pressure of the touch by detecting the variation of capacitance when the touch is generated.

FIG. 4 illustrates a case where the first electrode 120 is disposed at an upper side of the second electrode 130 as an example, but the first electrode 120 may also be disposed at a lower side of the second electrode 130.

The elastic member 160 may be disposed between the first electrode 120 and the second electrode 130.

For example, one surface of the elastic member 160 may be in contact with the first electrode 120, and the other surface of the elastic member 160 may be in contact with the second electrode 130.

The elastic member 160 may serve to absorb impact from the outside, and to this end, the elastic member 160 may have elastic force. For example, the elastic member 160 may be deformed by pressure from the outside, and may have elastic force, by which the elastic member 130 is restorable to an original state when the pressure from the outside is removed.

Further, the elastic member 160 may have an insulating property that prevents the first electrode 120 and the second electrode 130 from electrically contacting each other.

The elastic member 160 may include a porous polymer. For example, the elastic member 160 may have a foam body, such as a sponge.

For example, the elastic member 160 may include thermoplastic elastomer, polystyrene, polyolefin, polyurethane thermoplastic elastomers, polyamides, synthetic rubbers, polydimethylsiloxane, polybutadiene, polyisobutylene, [poly(styrene-butadienestyrene)], polyurethanes, polychloroprene, polyethylene, silicone, and a combination thereof, but is not limited thereto.

Figure 5A:
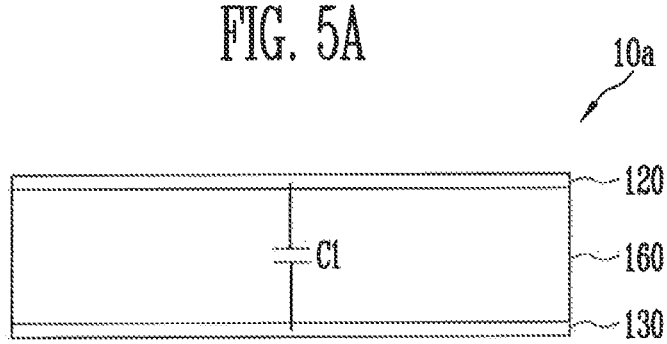
FIGS. 5A and 5B are diagrams illustrating an operation of the pressure sensor illustrated in FIG. 4.
Figure 5B:
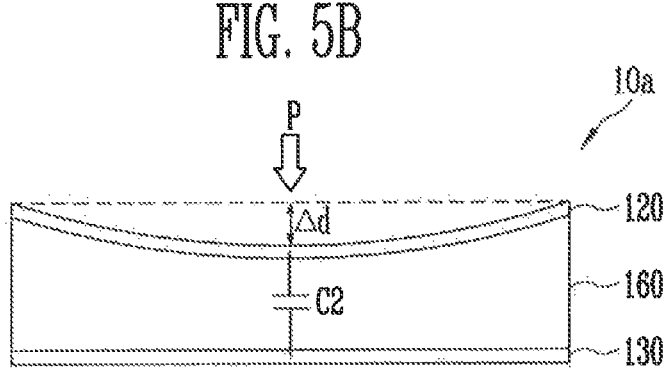

FIGS. 5A and 5B are diagrams illustrating an operation of the pressure sensor 10a illustrated in FIG. 4. Particularly, FIG. 5A illustrates a state where a pressure P is not applied to the pressure sensor 10a, and FIG. 5B illustrates a state where a pressure P is applied to the pressure sensor 10a.

Referring to FIG. 5A, when the pressure P is not applied to the pressure sensor 10a, first capacitance C1 may be formed between the first electrode 120 and the second electrode 130.

Referring to FIG. 5B, when the pressure is applied to the pressure sensor 10a by a touch of a user or the like, the pressure sensor 10a may be compressed along a z-axis. For example, a distance between the first electrode 120 and the second electrode 130 is changed in the area of the touch, and thus capacitance between the first electrode 120 and the second electrode 130 may be changed.

For example, when a distance between the first electrode 120 and the second electrode 130 is changed by the applied pressure P by a distance Δd, the first capacitance C1 may be changed to second capacitance C2.

Finally, when the external pressure P is increased, the value of Δd is increased, and the capacitance of the first electrode 120 and the second electrode 130 may also be increased.

Accordingly, it is possible to detect an intensity of pressure P and the like by using a variation of capacitance generated in the pressure sensor 10a.

Further, it is possible to calculate a value of Δd that is the degree (hereinafter, referred to as a displacement of the pressure sensor 10a) of transformation of the pressure sensor 10a by using the variation of capacitance.

The pressure P applied to the pressure sensor 10a may be primarily generated by a touch of a user, but the pressure P may alternatively be applied by other means. For example, the pressure P applied to the touch sensor 100 may be generated by a stylus or by another such implement.

Figure 6:
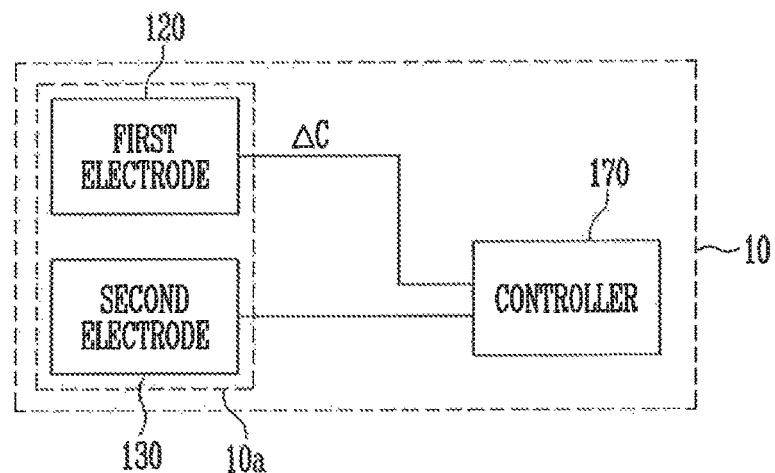
FIG. 6 is a diagram illustrating a touch sensor including a controller according to an exemplary embodiment of the present disclosure.

FIG. 6 is a diagram illustrating the touch sensor including a controller according to an exemplary embodiment of the present disclosure. Particularly, in FIG. 6, an illustration of the elastic member 160 is omitted for convenience of the description.

Referring to FIG. 6, the touch sensor 10, according to an exemplary embodiment of the present disclosure, may further include a controller 170.

The controller 170 may detect a pressure applied to the touch sensor 10 by detecting a variation of capacitance ΔC existing between the first electrodes 120 and the second electrodes 130.

For example, the controller 170 may detect the variation of capacitance ΔC by using output signals of the first electrodes 120.

The controller 170 may calculate an intensity (e.g. pressure) of the touch by referring to a size of the variation ΔC of capacitance. Further, the controller 170 may also calculate a displacement of the pressure sensor 10a by referring to a size of the variation ΔC of capacitance.

Further, the first electrodes 120 and the second electrodes 130, according to exemplary embodiments of the present disclosure, are disposed in a matrix shape, so that the controller 170 may also calculate a position of the touch, as well as an intensity (e.g. pressure) of the touch.

For example, in a case where the first electrodes 120 correspond to detecting electrodes and the second electrodes 130 correspond to driving electrodes, when a detection signal corresponding to the variation of capacitance ΔC is output from the $i^{th}$ first electrode while the $j^{th}$ second electrode is driven, it may be determined that a touch is input to a position, at which the $i^{th}$ first electrode and the $j^{th}$ second electrode overlap.

Figure 7:
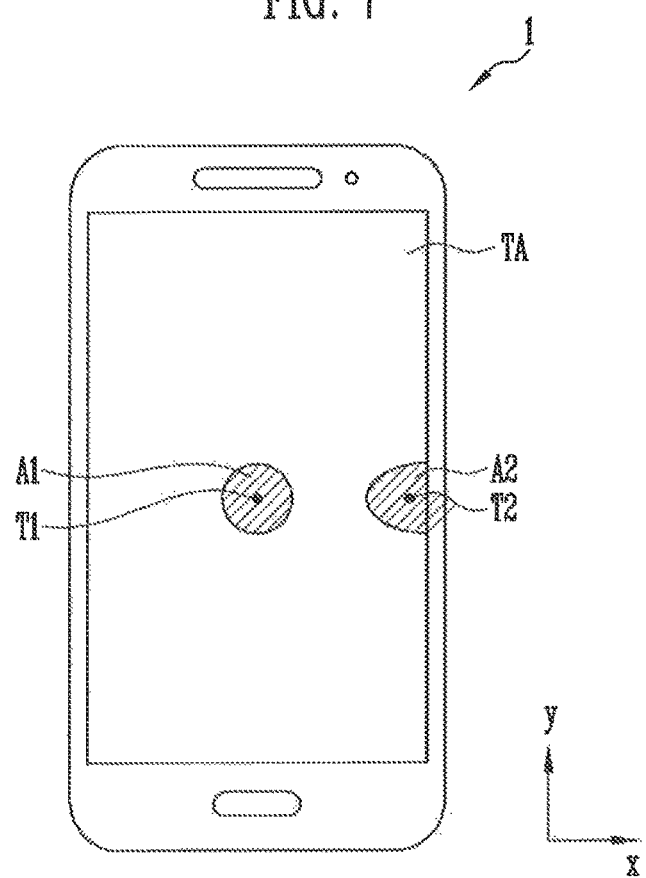
FIG. 7 is a diagram illustrating an example of a case where a touch is input into a display device, according to an exemplary embodiment of the present disclosure.

FIG. 7 is a diagram illustrating an example of a case where a touch is input into a display device according to an exemplary embodiment of the present disclosure.

In FIG. 7, a case where a touch is input to a first target point T1 and a second target point T2, different from the first target point T1, will be described as an example. A position of the first target point T1 may correspond to a center of the display device 1, and a position of the second target point T2 may be adjacent to a border of the display device 1.

As illustrated in FIG. 7, when a user touches the first target point T1 by applying predetermined power, power is applied to a first area A1 including the first target point T1.

Accordingly, distances between the first electrodes 120 and the second electrodes 130 disposed in a region overlapping the first area A1 are changed. In this case, the same power (e.g. pushing force) is not applied to the entire first area A1, so that the displacement of the pressure sensor 10a for each position in the first area A1 may be different.

Particularly, the displacement of the pressure sensor 10a in the first target point T1 is greatest, and the displacement of the pressure sensor 10a may be decreased when the pressure sensor 10a is far from the first target point T1.

Figure 8:
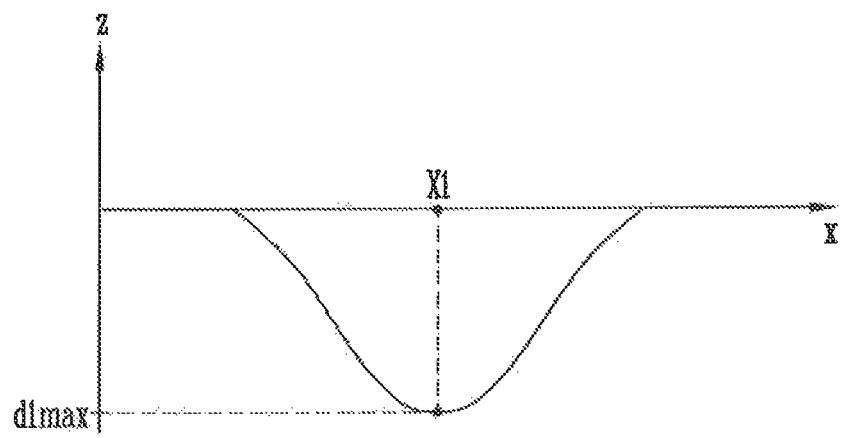
FIG. 8 is a graph of a displacement of the pressure sensor of each position in an X-axis when a touch is input into a first target point T1 illustrated in FIG. 7.

FIG. 8 is a graph of a displacement of the pressure sensor 10a of each position in an X-axis when a touch is input into the first target point T1 illustrated in FIG. 7.

Referring to FIG. 8, when it is assumed that an x-axial position of the first target point T1 is X1, a displacement d1max of the pressure sensor 10a is greatest. Further, when the pressure sensor 10a is far from X1, the displacement of the pressure sensor 10a is gradually decreased.

As illustrated in FIG. 7, when the user touches the second target point T2 by applying a predetermined power, power is applied to a second area A2 including the second target point T2.

Accordingly, distances between the first electrodes 120 and the second electrodes 130 disposed in a region overlapping the second area A2 are changed. In this case, the same power is not applied to the entire second area A2, so that the displacement of the pressure sensor 10a at each position in the second area A2 may be different.

Figure 9:
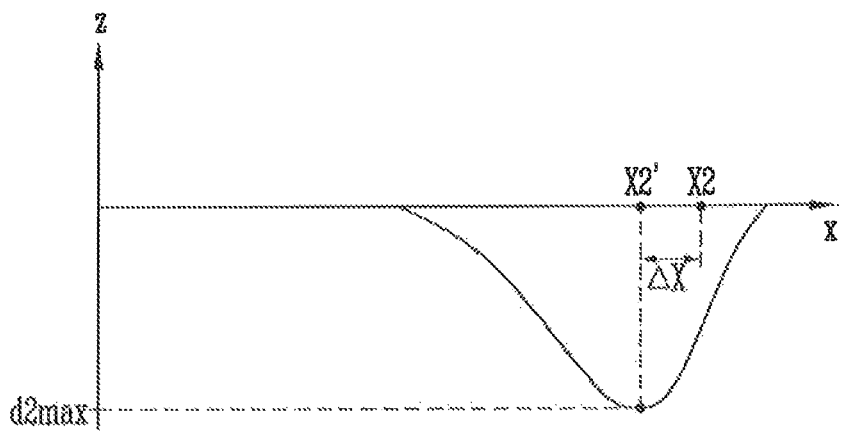
FIG. 9 is a graph of a displacement of the pressure sensor of each position in the X-axis when a touch is input into a second target point T2 illustrated in FIG. 7.

FIG. 9 is a graph of a displacement of the pressure sensor 10a of each position in the X-axis When a touch is input into the second target point T2 illustrated in FIG. 7.

Referring to FIG. 9, when it is assumed that an x-axial position of the second target point T2 is X2, X2 might not correspond to a position X2', in which a displacement of the pressure sensor 10a has the greatest value d2max.

According to the characteristic of the structure of the display device 1, in which a lateral wall of the bracket 70 is coupled to the window 60 by the second attachment member 50, a border of the touch area TA is constrained by the lateral wall of the bracket 70 and the second attachment member 50. For example, when the touch is input into an area adjacent to the border of the touch area TA, a center of the power of the power is inclined in a direction of the center of the display device 1, of which constraint power is relatively low.

Accordingly, even though the user touches the second target point T2, according to the characteristic of the structure of the display device 1, the touch moves in the direction of the center of the display device (or the direction of the center of the touch area TA) by a predetermined distance ΔX (the degree of movement of the touch contrary to the intention of the user, hereinafter, referred to as a touch movement amount). For example, when the position of the touch is calculated by using only the detection signal output from the pressure sensor 10a, the controller 170 may recognized that the touch is input into another position different from the intended position of the user according to the characteristic of the structure of the display device 1.

The controller 170, according to an exemplary embodiment of the present disclosure, may generate a final position of the touch by compensating for the movement amount ΔX of a touch for the position, in which the displacement of the pressure sensor 10a has the greatest value, so as to decrease a touch recognition error according to the movement amount of a touch.

Figure 10:
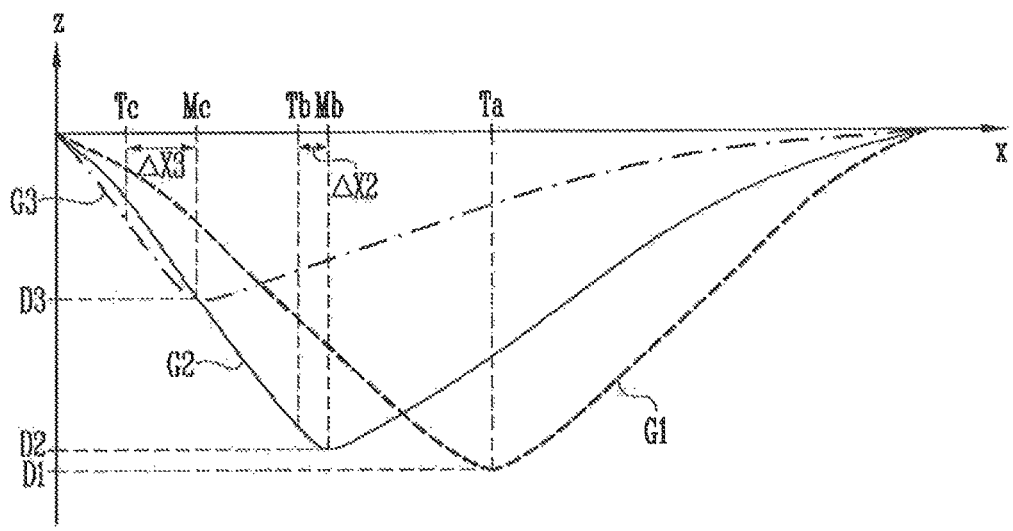
FIG. 10 is a diagram illustrating an example of a movement amount of a touch according to an input position of a touch.

FIG. 10 is a diagram illustrating an example of a movement amount of a touch according to an input position of the touch.

In FIG. 10, graph G1 represents a displacement of the pressure sensor 10a for each x-axial position when a touch is input into a center Ta of the touch area TA. Graph G2 represents a displacement of the pressure sensor 10a for each x-axial position when a touch is input into a position Tb, which is spaced apart from the center Ta by b mm. Graph G3 represents a displacement of the pressure sensor 10a for each x-axial position when a touch is input into a position Tc, which is spaced apart from the center Ta by c mm. Here, b and c are predetermined positive integers, and c is larger than b.

Further, it is assumed that graphs G1 to G3 represent the displacements of the pressure sensor 10a calculated when a touch is applied to the respective positions Ta, Tb, and Tc with the same power.

Referring to graph G1 of FIG. 10, a position having the greatest value D1 of a displacement of the pressure sensor 10a may be a touch input position. For example, when a touch is input into the center Ta, influence of constraint power applied to the border of the touch area TA is minimal, so that the position having the greatest value D1 of the displacement of the pressure sensor 10a may be the same as the actual touch input position.

Referring to graph G2 of FIG. 10, a position Mb having the greatest value D2 of a displacement of the pressure sensor 10a may be a space between a touch input position Tb and the center Ta. For example, by the influence of the constraint power applied to the border of the touch area TA, the greatest power is applied to a position inclined by a movement amount ΔX2 of the touch in the direction of the center Ta. Accordingly, the position Mb having the greatest value D2 of the displacement of the pressure sensor 10a may be different from the actual touch input position Tb.

Accordingly, to accurately calculate the actual touch input position by using the detection signal obtained from the pressure sensor 10a by the controller 170, the movement amount ΔX2 of the touch to the position Mb having the greatest value D2 of the displacement of the pressure sensor 10a may be compensated for. The position Mb having the greatest value D2 of the displacement of the pressure sensor 10a may be calculated by using the detection signal.

Referring to graph G3 of FIG. 10, a position Mc having the greatest value D3 of a displacement of the pressure sensor 10a may be a space between a touch input position Tc and the center Ta. For example, by influence of constraint power applied to the border of the touch area TA, the greatest power is applied to a position inclined by a movement amount ΔX3 of the touch in the direction of the center Ta. Accordingly, the position Mc having the greatest value D3 of the displacement of the pressure sensor 10a may be different from the actual touch input position Tc.

For example, in order to accurately calculate the actual touch input position by using the detection signal obtained from the pressure sensor 10a by the controller 170, the movement amount ΔX3 of the touch to the position Mc having the greatest value D3 of the displacement of the pressure sensor 10a may be compensated for. The position Mc having the greatest value D3 of the displacement of the pressure sensor 10a may be calculated by using the detection signal.

Referring to graphs G1 to G3 of FIG. 10, the movement amount ΔX3 of the touch when the touch is input into the position Tc spaced apart from the center Ta by c mm is larger than the movement amount ΔX2 of the touch when the touch is input into the position Tb spaced apart from the center Ta by b mm. Further, the movement amount of a touch when the touch is input into the center Ta is 0.

For example, when the touch input position is far from the center Ta of the touch area TA (or is close to the border of the touch area), influence by the constraint power is large, so that the movement amount of a touch may be increased.

The controller 170, according to an exemplary embodiment of the present disclosure, may calculate the position of the touch by correcting a first position having the greatest value of the displacement of the pressure sensor 10a by a first correction value corresponding to the first position. For example, the controller 170 may accurately calculate the actual touch input position by compensating for the movement amount of a touch to the first position having the greatest value of the displacement of the pressure sensor 10a by using the first correction value.

The touch sensor, according to an exemplary embodiment of the present disclosure, may further include a memory device for storing the first correction value corresponding to the first position. Information on the movement amount of a touch corresponding to the first position may also be stored in the memory device. The controller 170 may directly obtain information on the first correction value from the memory device or may calculate the first correction value by using the information stored in the memory device. The memory device may be included in the controller 170, or may also be separately formed from the controller 170.

For example, when the position having the greatest displacement of the pressure sensor 10a during the input of the touch is the center, the controller 170 may generate and output a position of the center as a touch input position.

Otherwise, when the position having the greatest displacement of the pressure sensor 10a during the input of the touch is a position spaced from the center by b mm, the controller 170 may calculate the position of the touch by using the first correction value. For example, the controller 170 may generate a position obtained by compensating for a value corresponding to "ΔX2" to the position having the greatest displacement of the pressure sensor 10a.

Otherwise, when the position having the greatest displacement of the pressure sensor 10a during the input of the touch is a position spaced from the center by c mm, the controller 170 may calculate the position of the touch by using the first correction value. For example, the controller 170 may generate a position obtained by compensating for a value corresponding to "ΔX3" to the position having the greatest displacement of the pressure sensor 10a.

Referring to FIG. 10, the greatest displacement D1 of the pressure sensor when the touch is input into the center Ta is larger than the greatest displacement D2 of the pressure sensor when the touch is input into the position Tb spaced apart from the center Ta by b mm. Further, the greatest displacement D2 of the pressure sensor when the touch is input into the position Tb spaced apart from the center Ta by b mm is larger than the greatest displacement D3 of the pressure sensor when the touch is input into the position spaced apart from the center Ta by c mm.

For example, even though the touch is input into each of the positions Ta, Tb, and Tc with the same power, when the touch is far from the center of the touch area (or is close to the border of the touch area), the intensity of power measured is decreased.

As described above, according to the characteristic of the structure of the display device 1, in which the lateral wall of the bracket 70 is coupled to the window 60 by the second attachment member 50, a border of the touch area TA is constrained by the lateral wall of the bracket 70 and the second attachment member 50. For example, even though the touch is input with the same power, the degree of press (or a distance variation between the first electrode and the second electrode, or the displacement of the pressure sensor 10a) is varied. For example, the center having a relatively small constraint power may be pressed a lot, and the border having a relatively high constraint power may be pressed little.

The structural characteristic of the display device causes an error of the recognition of the intensity of the touch, and in order to prevent the error, the intensity of pressure for each touch position may be compensated for.

The controller 170, according to an exemplary embodiment of the present disclosure, calculates an intensity of the touch by using the detection signal output from the pressure sensor 10a and a second correction value. However, the degree of press (touch sensor displacement) of the pressure sensor 10 is different for each touch input position, so that the second correction value for compensating for the intensity of pressure is different for each position. Accordingly, it is possible to calculate the intensity of the touch by using a pre-calculated second correction value corresponding to a touch position.

In this case, when a touch position is close to the border of the touch area, a second correction value corresponding to the position may be large.

A second correction value corresponding to each touch position may be stored in the memory device.

Figure 11:
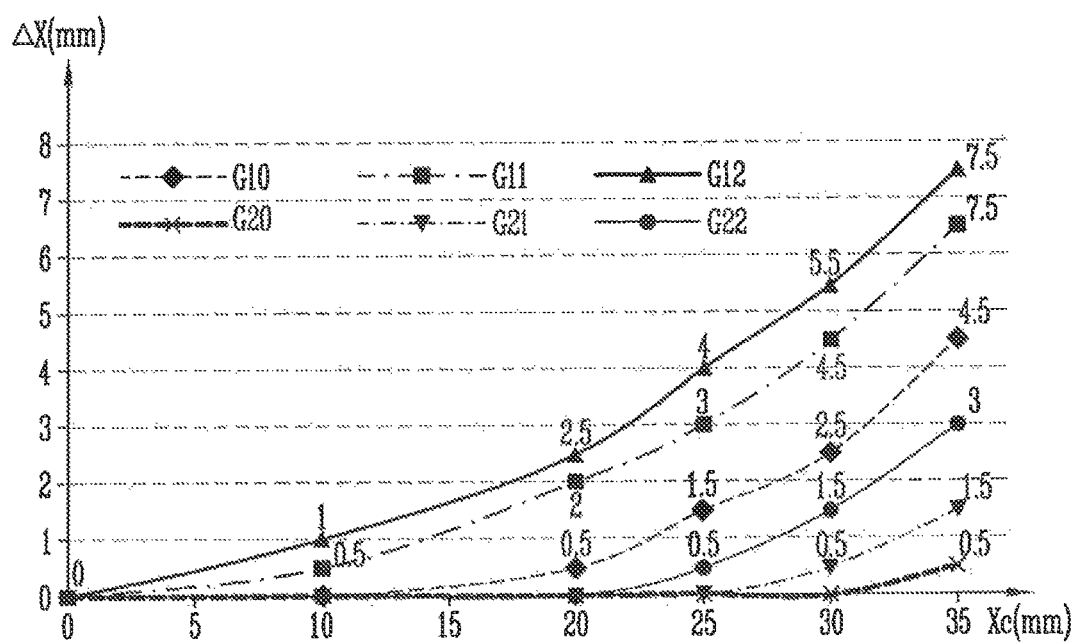
FIG. 11 is a graph illustrating an example of a movement amount of a touch according to an actual touch position.

FIG. 11 is a graph illustrating an example of a movement amount of a touch according to an actual touch position.

In FIG. 11, a horizontal axis represents a distance Xc between the center of the touch area TA and an actual touch input position, and a vertical axis represents a movement amount ΔX of a touch for each position.

Further, in FIG. 11, graphs G10 to G12 represent the movement amount ΔX of a touch when a glass substrate is disposed on the pressure sensor 10a and a touch is input onto the glass substrate.

Graphs G20 to G22 represent the movement amount ΔX of a touch when a polyester film is disposed on the pressure sensor 10a and a touch is input onto the polyester film.

Referring to FIG. 11, the movement amount ΔX of a touch in a case where a glass substrate is disposed on the pressure sensor 10a is larger than the movement amount ΔX of a touch in a case where a polyester film is disposed on the pressure sensor 10a.

For example, the movement amount ΔX of a touch may be influenced by a property of the substrate disposed on the pressure sensor 10a, and for example, the movement amount ΔX of a touch may be proportional to the Young's modulus of the substrate.

Accordingly, in the display device, according to an exemplary embodiment of the present disclosure, the movement amount ΔX of a touch may be proportional to the Young's moduli of the configurations (for example, the display panel or the window) disposed on the touch sensor.

In FIG. 11, graph G10 represents the movement amount ΔX of a touch in a case where a thickness of the glass substrate is 0.4 mm, graph G11 represents the movement amount ΔX of a touch in a case where a thickness of the glass substrate is 0.8 mm, and graph G12 represents the movement amount ΔX of a touch in a case where a thickness of the glass substrate is 1.2 mm.

Referring to graphs G10 to G12, the movement amount ΔX of a touch in the case where a thickness of the glass substrate is 1.2 mm is larger than the movement amount ΔX of a touch in the cases where a thickness of the glass substrate is 0.8 mm and 0.4 mm. Further, the movement amount ΔX of a touch in the case where a thickness of the glass substrate is 0.8 mm is larger than the movement amount ΔX of a touch in the case where a thickness of the glass substrate is 0.4 mm.

Next, In FIG. 11, graph G20 represents the movement amount ΔX of a touch in a case where a thickness of the polyester film is 0.4 mm, graph G21 represents the movement amount ΔX of a touch in a case where a thickness of the polyester film is 0.8 mm, and graph G22 represents the movement amount ΔX of a touch in a case where a thickness of the polyester film is 1.2 mm.

Referring to graphs G20 to G22, the movement amount ΔX of a touch in the case where a thickness of the polyester film is 1.2 mm is larger than the movement amount ΔX of a touch in the cases where a thickness of the polyester film is 0.8 mm and 0.4 mm. Further, the movement amount ΔX of a touch in the case where a thickness of the polyester film is 0.8 mm is larger than the movement amount ΔX of a touch in the case where a thickness of the polyester film is 0.4 mm.

For example, the movement amount ΔX of a touch may be influenced by a thickness of the substrate even though the property of the substrate disposed on the pressure sensor 10a is the same, and for example, the movement amount ΔX of a touch may be proportional to a thickness of the substrate.

Accordingly, in the display device, according to an exemplary embodiment of the present disclosure, the movement amount of a touch may be proportional to thicknesses of the configurations (for example, the display panel or the window) disposed on the touch sensor.

In FIGS. 7 to 11, exemplary embodiments of the present invention are described with reference to the displacement of the pressure sensor 10a according to the x-axial position, and to accurately calculate the position of the touch, the same process may also be performed on a y-axial position.

The touch sensor 10, according to an exemplary embodiment of the present disclosure, has been described to include the pressure sensor 10a, of which capacitance is changed when the distances between the first electrodes 120 and the second electrodes 130 are changed, but the present disclosure is not limited thereto.

Figure 12:
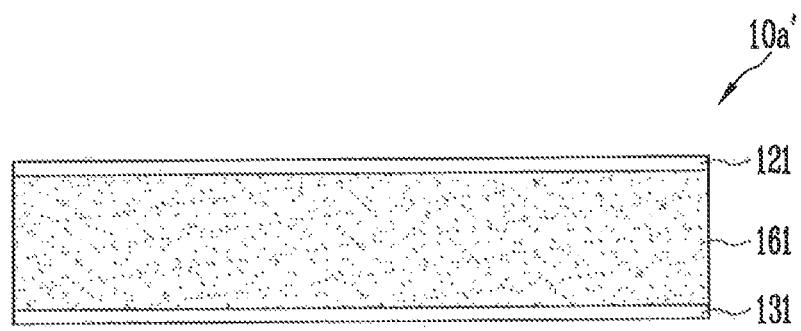
FIG. 12 is a cross-sectional view of a pressure sensor according to an exemplary embodiment of the present disclosure.

FIG. 12 is a cross-sectional view of a pressure sensor according to an exemplary embodiment of the present disclosure.

Referring to FIG. 12, a pressure sensor 10', according to an exemplary embodiment of the present disclosure, may include a first electrode 121, a second electrode 131, and a variable resistance factor 161 provided between the first electrode 121 and the second electrode 131.

The first electrode 121 includes a conductive material. According to an exemplary embodiment of the present disclosure, the conductive material may include a metal or an alloy thereof. The metal may include gold (Au), silver (Ag), aluminum (Al), molybdenum (Mo), chromium (Cr), titanium (Ti), nickel (Ni), neodymium (Nd), copper (Cu), platinum (Pt), and/or the like.

According to an exemplary embodiment of the present disclosure, the first electrode 121 may include a transparent conductive material. The transparent conductive material may include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide ($SnO_2$), a carbon nano tube, graphene, and/or the like.

Next, the second electrode 131 is spaced apart from the first electrode 121, and includes a conductive material. The conductive material may be selected from the materials of the first electrode 121, and may include the same material as that of the first electrode 121 or a different material from that of the first electrode 210.

Next, the variable resistance factor 161 may be provided between the first electrode 121 and the second electrode 131.

The variable resistance factor 161 is a constituent element, of which an electric characteristic is changed according to the degree of transformation, and particularly, includes a material, of which resistance is changed according to pressure from the outside between the first electrode 121 and the second electrode 131.

For example, when power provided to the variable resistance factor 161 is increased, resistance of the variable resistance factor 161 may be decreased. Alternatively, when power provided to the variable resistance factor 161 is increased, resistance of the variable resistance factor 161 may also be increased.

The variable resistance factor 161 may include a material, of which resistance is changed according to pressure. For example, the variable resistance factor 161 may include materials referred to as a force sensitive material or force sensitive resistor.

The variable resistance factor 161 may include at least one of piezo-electric materials, such as lead zirconate titanate (PZT), barium titanate ($BaTiO_3$), polytrifluoroethylene (PTrFE), and polyvinylidene fluoride (PVDF), a piezo-electric semiconductor, such as poly crystal, piezoelectric single crystal (PMN-PT single crystal), zinc oxide (ZnO), molybdenum disulphide ($MoS_2$), carbon powder, Quantum Tunneling Composite (QTC), silicon, carbon nano tube, and/or graphene.

Figure 13A:
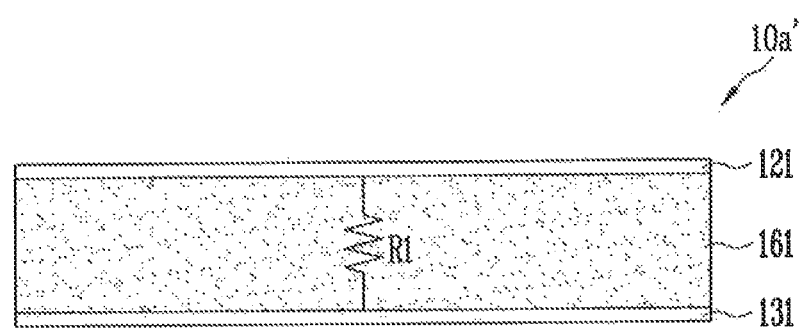
FIGS. 13A and 13B are diagrams illustrating an operation of the pressure sensor illustrated in FIG. 12.
Figure 13B:
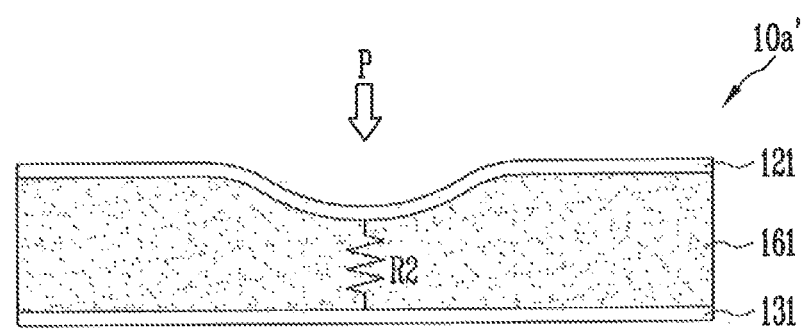

FIGS. 13A and 13B are diagrams for describing an operation of the pressure sensor 10a' illustrated in FIG. 12. Particularly, FIG. 13A illustrates a state where a pressure is not applied to the pressure sensor 10a', and FIG. 13B illustrates a state where a pressure P is applied to the pressure sensor 10'.

Referring to FIG. 13A, when a pressure is not applied to the pressure sensor 10a', the first electrode 121 and the second electrode 131 are spaced apart from each other by a first distance with the variable resistance factor 161 interposed therebetween, and the variable resistance factor 161 may have first resistance R1.

Referring to FIG. 13B, when the pressure P is applied to the pressure sensor 10' according to a touch of a user and the like, a distance between the first electrode 121 and the second electrode 131 may be changed, and thus, the form of the variable resistance factor 161 may be changed. For example, the resistance of the variable resistance factor 161 may be changed from the first resistance R1 to second resistance R2.

It is accordingly possible to detect an intensity of pressure and the like by referring to the degree of change of the resistance.

Figure 14:
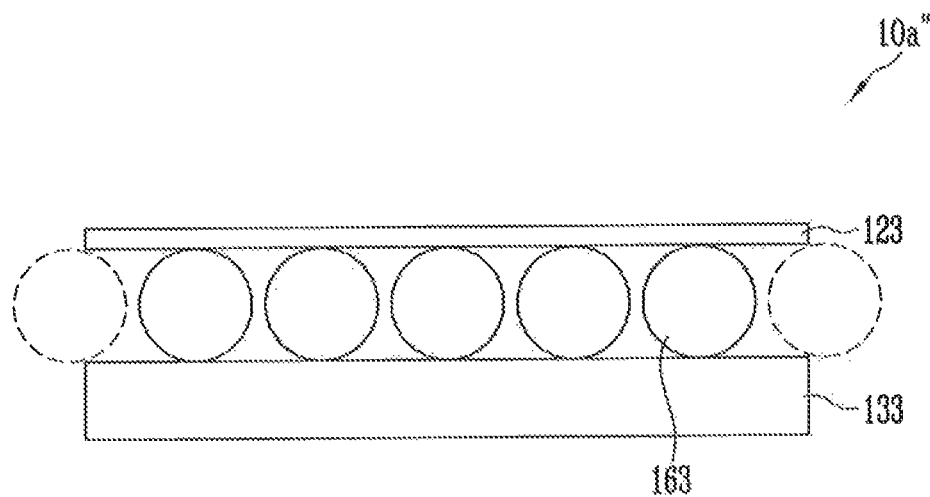
FIG. 14 is a cross-sectional view of a pressure sensor according to an exemplary embodiment of the present disclosure.

FIG. 14 is a cross-sectional view of a pressure sensor according to an exemplary embodiment of the present disclosure.

Referring to FIG. 14, a pressure sensor 10a" according to the present disclosure may include a substrate 133, an insulating layer 123, and nano particles 163 provided between the substrate 133 and the insulating layer 123.

The substrate 133 and the insulating layer 123 may include an insulating material, such as glass and resin. Further, the substrate 133 and the insulating layer 123 may include a flexible material so as to be bendable or foldable, and may have a single-layer structure or a multi-layer structure.

The nano particles 163 may be provided between the substrate 133 and the insulating layer 123. Further, the nano particle 163 is a constituent element, of which an electric characteristic is changed according to a degree of transformation, and includes a material, of which resistance is changed according to a pressure from the outside.

For example, the nano particles 163 may be provided in a form of a nano tube, a nano column, a nano rod, a nano hole, a nano wire, and the like.

The nano particles 163 may include particles of carbon, graphite, metalloid, metal, a conductive oxide of the metalloid or the metal, and a conductive nitride of the metalloid or the metal, or include particles in a core shell structure, in which the particles are coated on an insulating bead, or a combination thereof. The semi-metal may include any one of antimony (Sb), germanium (Ge), and arsenic (As), or an alloy thereof. The metal may include a zinc (Zn), aluminum (Al), scandium (Sc), chromium (Cr), manganese (Mn), iron (Fe), cobalt (Co), nickel Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include an indium tin oxide (ITO), an indium zinc oxide (IZO), an aluminum doped zinc oxide (AZO), a gallium indium zinc oxide (GIZO), a zinc oxide (ZnO), and a mixture thereof.

Although not illustrated in FIG. 14, electrodes for measuring a change of the nano particles 163 may be disposed between the substrate 133 and the insulating layer 123.

Further, FIG. 14 illustrates that the nano particles 163 are disposed in a single layer structure, but the present disclosure is not limited thereto, and the nano particles 163 may also be disposed in a multi-layer structure.

Figure 15A:
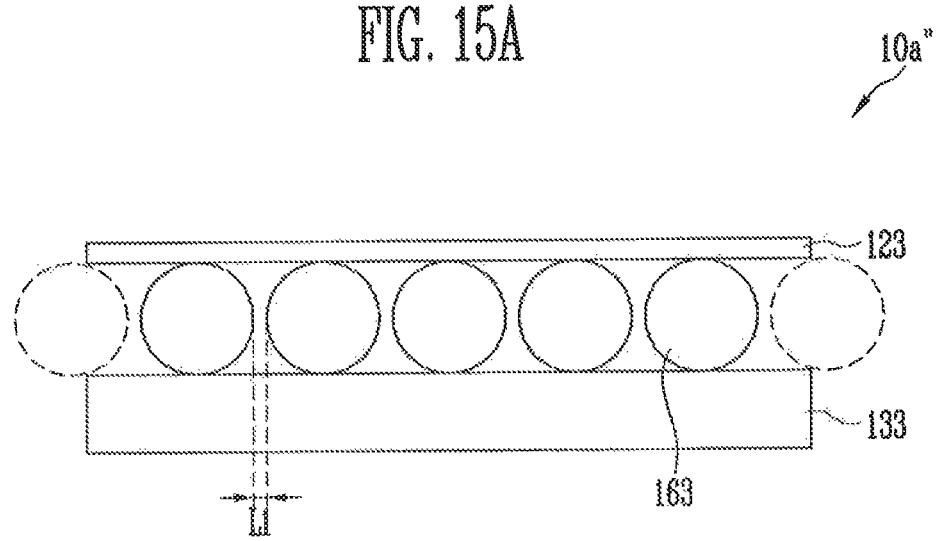
FIGS. 15A and 15B are diagrams for describing an operation of the pressure sensor illustrated in FIG. 14.
Figure 15B:
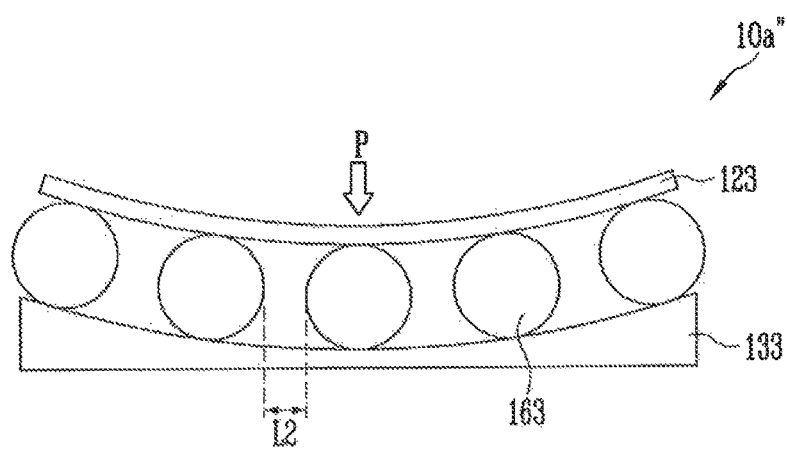

FIGS. 15A and 15B are diagrams for describing an operation of the pressure sensor 10a" illustrated in FIG. 14. Particularly, FIG. 15A illustrates a state where a pressure is not applied to the pressure sensor 10a", and FIG. 15B illustrates a state where a pressure P is applied to the pressure sensor 10".

Referring to FIG. 15A, when a pressure is not applied to the pressure sensor 10a", the nano particles 163 may be spaced apart from one another by a first distance L.

Referring to FIG. 15B, when the pressure P is applied to the pressure sensor 10a" according to a touch of a user and the like, a distance between the substrate 133 and the insulating layer 123 may be changed, and thus, the nano particles 163 may become far from one another. For example, the distance between the nano particles 163 may be changed from the first distance L1 to a second distance L2.

When the distance between the nano particles 163 is changed, a tunnel effect between the nano particles is changed, so that an electron movement probability is changed. Accordingly, resistance is changed, so that it is possible to detect an intensity of pressure by referring to a variation of resistance.

The pressure sensor may be formed in various ways in addition to the aforementioned approaches.

For example, the pressure sensor may have a structure of a strain gauge. A resistance line forming the strain gauge may include a material, such as a silver nano wire (AgNW), graphene, carbon nano tube, and an Indium Tin Oxide (TIO).

Figure 16A:
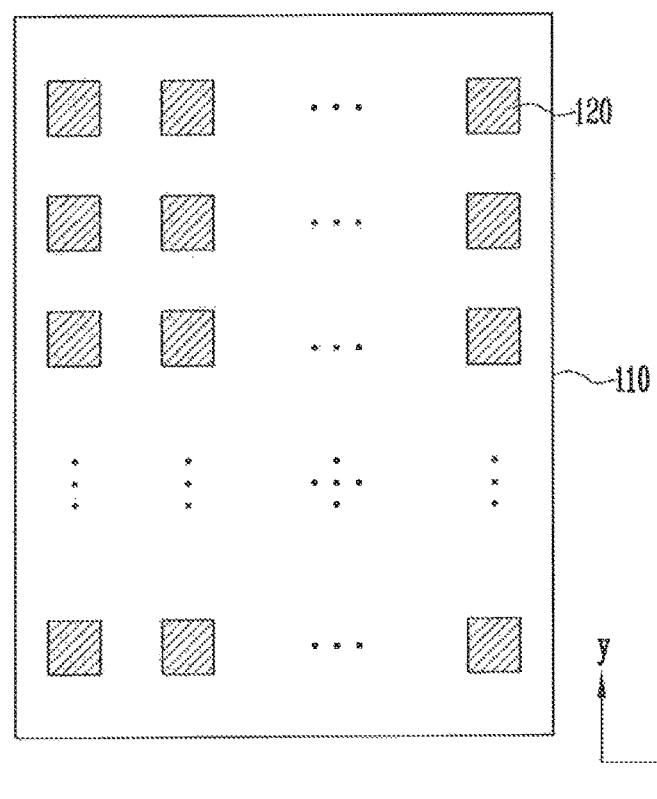
FIGS. 16A and 16B are diagrams illustrating a touch sensor according to an exemplary embodiment of the present disclosure, and a display device including the same.
Figure 16B:
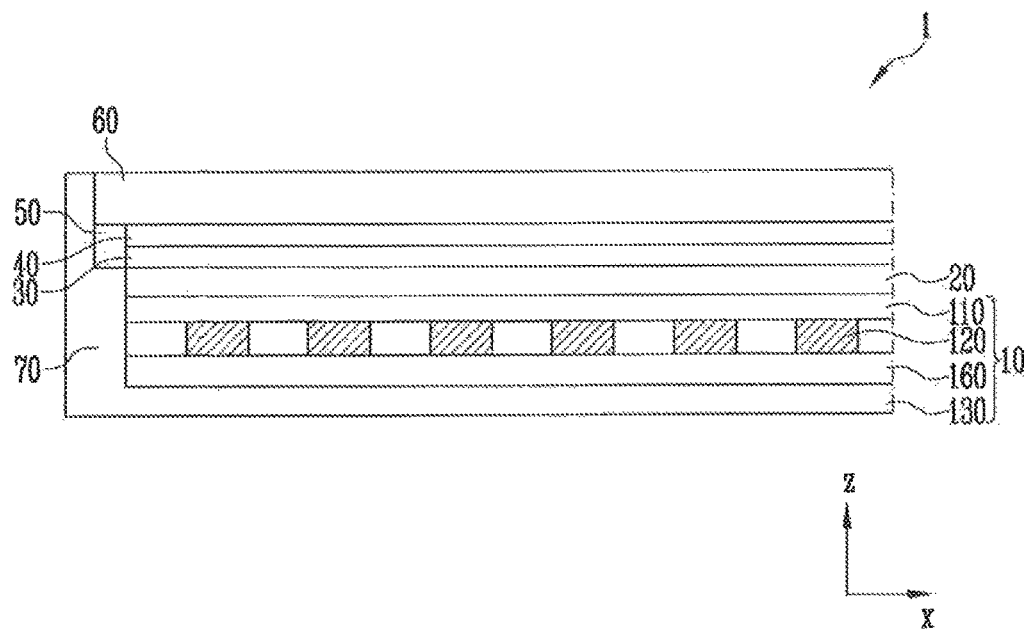

FIGS. 16A and 16B are diagrams illustrating a touch sensor according to an exemplary embodiment of the present disclosure, and a display device including the same.

With reference to FIG. 3, it is described that the first electrode 120 and the second electrode 130 are formed in a bar shape on the substrate 110, but referring to FIGS. 16A and 16B, a part of the bracket 70 may be utilized as a second electrode 130.

Accordingly, the bracket 70 may include a conductive material. Particularly, an area of the bracket 70 overlapping a first electrode 120 may be conductive, and the corresponding area may be utilized as the second electrode 130.

Particularly, when a lower portion of the bracket 70 is utilized as the second electrode 130 and thus the second electrode 130 is formed in a plate shape, the first electrodes 120 may be arranged in the x-axis direction and the y-axis direction on the substrate 110 so as to detect a position of the touch.

In the display device 1, according an exemplary embodiment of the present disclosure, a touch sensor 10 and a display panel 20 are sequentially laminated, e.g. first the touch sensor 10 is laminated upon a surface and thereafter, the display panel 20 is laminated upon the touch sensor 10 but the present disclosure is not limited thereto.

Figure 17:
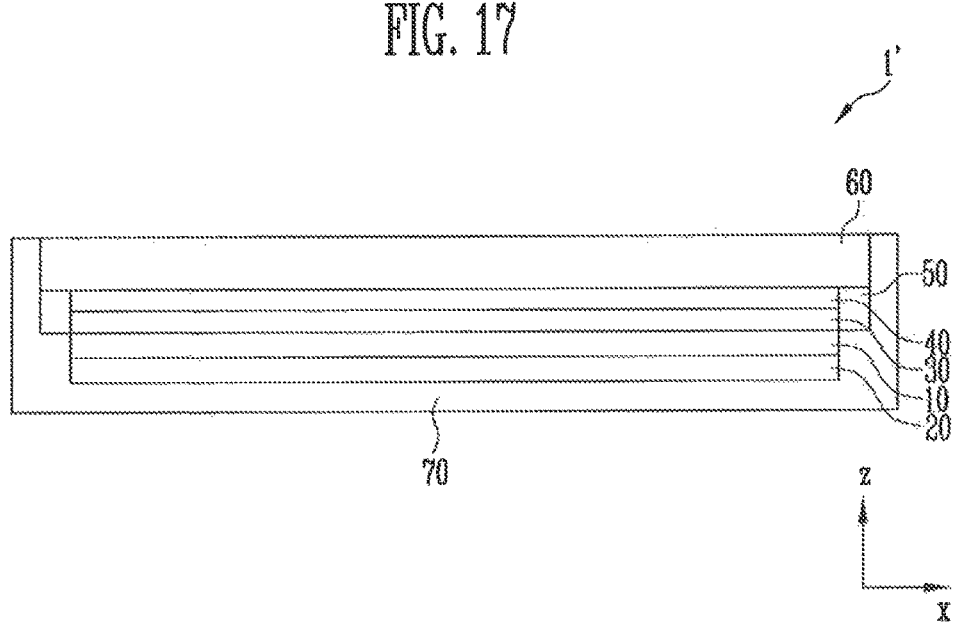
FIG. 17 is a cross-sectional view illustrating a display device according to an exemplary embodiment of the present disclosure.

FIG. 17 is a cross-sectional view illustrating a display device, according to an exemplary embodiment of the present disclosure.

Referring to FIG. 17, a display device 1', according to an exemplary embodiment of the present disclosure, may include a touch sensor 10, a display panel 20, a window 60, and a bracket 70, as described with reference to FIGS. 1A and 1B.

However, the touch sensor 10 may be disposed on the display panel 20. For example, the touch sensor 10 may be laminated within the display device to be closer to the window 60 than the display panel 20. In this case, each of the substrate 110, first electrodes 120 and 121, second electrodes 130 and 131, and an elastic member 160 (or a variable resistance material 161) included in the touch sensor 10 may include a transparent material.

Although the present invention has been described with reference to exemplary embodiments thereof, those skilled in the art may understand that the present invention may be variously modified and changed without departing from the spirit and scope area of the present invention.

What is claimed is:

1. A touch sensor, comprising:
a pressure sensor configured to become compressed along a first axis in response to a touch input into a touch area; and
a controller configured to calculate a position of the touch and an intensity of the touch by using a detection signal obtained from the pressure sensor,
wherein the controller is further configured to calculate a first position, which has a greatest value of compression of the pressure sensor along the first axis, and calculate a corrected position of the touch by correcting the first position by a first correction value, and wherein the first correction value is larger as the first position is closer to a border of the touch area.

2. The touch sensor of claim 1, wherein the first position is different from the position of the touch.

3. The touch sensor of claim 2, wherein the first correction value corresponds to a distance between the position of the touch and the first position.

4. The touch sensor of claim 2, wherein a distance between the position of the touch and the first position is larger as the position of the touch is closer to a border of the touch area.

5. The touch sensor of claim 2, wherein a distance between a center of the touch area and the first position is smaller than a distance between the center of the touch area and the position of the touch.

6. The touch sensor of claim 1, wherein the controller is further configured to calculate the intensity of the touch by calculating a first touch intensity according to the greatest value of compression and then calculating a corrected touch intensity by using a second correction value, wherein the second correction value is larger as the position of the touch is closer to the border of the touch area.

7. The touch sensor of claim 1, wherein the pressure sensor includes:
a first electrode;
a second electrode spaced apart from the first electrode, and configured to form a capacitance therebetween; and
an elastic member disposed between the first electrode and the second electrode,
wherein the controller is further configured to obtain a detection signal that is dependent upon a change in the capacitance between the first and second electrodes.

8. The touch sensor of claim 1, wherein the pressure sensor includes:
a first electrode;
a second electrode spaced apart from the first electrode; and
a variable resistance factor disposed between the first electrode and the second electrode, wherein the controller is configured to obtain a detection signal that is dependent upon a change in a resistance of the variable resistance factor.

9. A display device, comprising:
a touch sensor including a pressure sensor, which is configured to become compressed along a first axis in response to a touch input into a touch area, and configured to calculate a position of the touch and an intensity of the touch by using a detection signal obtained from the pressure sensor;
a display panel disposed in one surface of the touch sensor;
a bracket configured to accommodate the touch sensor and the display panel; and
a window coupled to the bracket, wherein the touch sensor is further configured to calculate a first position, which has a greatest value of compression of the pressure sensor along the first axis, and calculate the position of the touch by correcting the first position by a first correction value that is predetermined and looked up according to the first position, wherein the first correction value is larger as the first position is closer to a border of the touch area.

10. The display device of claim 9, wherein the first correction value is proportional to a Young's modulus of the display panel or the window.

11. The display device of claim 9, wherein the first correction value is proportional to a thickness of the display panel or the window.

12. The display device of claim 9, wherein when the touch is located in a center area of the touch area, the first position is calculated as a position of the touch.

13. The display device of claim 9, wherein the touch is located in a position that is different from the first position.

14. The display device of claim 13, wherein the first correction value corresponds to a distance between the position of the touch and the first position.

15. The display device of claim 13, wherein a distance between a center of the touch area and the first position is smaller than a distance between the center of the touch area and the position of the touch.

16. The display device of claim 9, wherein the touch sensor is further configured to calculate the intensity of the touch by using a second correction value corresponding to the position of the touch.

17. The display device of claim 16, wherein the second correction value is proportional to a Young's modulus of the display panel or the window.

18. The display device of claim 16, wherein the second correction value is proportional to a thickness of the display panel or the window.

19. The display device of claim 18, wherein the second correction value is larger as the position of the touch is closer to a border of the touch area.

20. A touch-sensitive display device, comprising:
a display panel;
a pressure sensor disposed on the display panel generating a detection signal in response to a touch thereon; and
a controller configured to calculate a first position of the touch and a first intensity of the touch in response to the detection signal of the pressure sensor and to correct the calculated first position of the touch or the calculated first intensity of the touch according to a distance between the calculated position of the touch and a nearest edge of the display panel,
wherein the controller is configured to correct the calculated first position or the calculated first intensity of the touch using a correction factor, that is calculated by the controller, to be greater as the calculated first position of the touch is closer to the nearest edge of the display panel.

* * * * *